Patented Mar. 6, 1928.

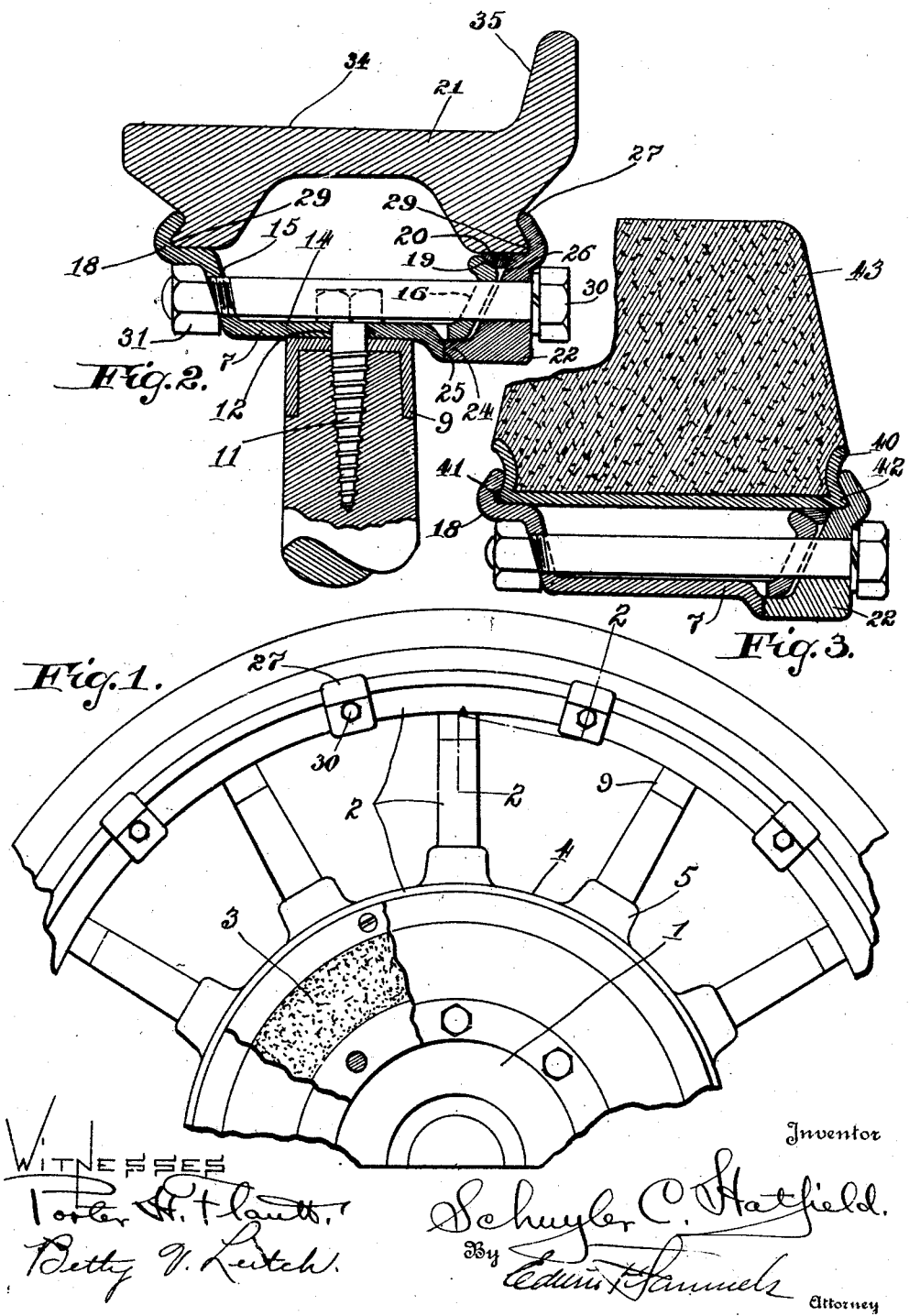

1,661,754

UNITED STATES PATENT OFFICE.

SCHUYLER C. HATFIELD, OF BALTIMORE, MARYLAND.

TIRE AND WHEEL.

Application filed July 20, 1922. Serial No. 576,360.

The present invention relates to a demountable steel or iron tire adapted to cooperate with an ordinary railway or traction rail and to a felly to which the same is demountably secured, the same being adapted to likewise receive, carry and cooperate with a demountable rim equipped with a solid rubber or pneumatic tire. This structure is shown in combination with a resilient wheel which is particularly adapted for use in this connection on account of its resiliency being well adapted for use either with a pneumatic tire, a solid tire or a steel tire cooperating with a traction rail as aforesaid.

It is the object of the invention not only to provide an elastic wheel for use on street cars and railway coaches, but to provide a wheel for busses and similar vehicles which makes the vehicle convertible traveling either on pavement when equipped with pneumatic or solid rubber tires or on the rails when it is equipped with steel tires, the demountable feature making it convenient and feasible to change on short notice from one to the other, so that the vehicle may to advantage run part of its route on the rails and part of its route on the pavement changing tires for this purpose intermediately of the run without considerable loss of time. In the accompanying drawing, I have illustrated a wheel, felly and tire, embodying the features of my invention in the preferred form. In the drawings, Figure 1 is a side elevation of an elastic wheel constructed in accordance with my invention, the wheel being shown fragmentarily for convenience of illustration.

Fig. 2, is a section on the line 2—2 of Figure 1 taken at right angles to the plane of Figure 1.

Fig. 3, is a section corresponding to Fig. 1, through a different type of tire and rim.

Referring to the drawings by numerals, the wheel illustrated includes an inner or hub portion 1, encircled by an outer annular section 2, referred to for convenience as a spoke section, this is spaced from the outer section to provide radial play, the space between the sections being occupied by an annular resilient pad 3, which takes up the play between the sections and supplies resiliency to the structure. The outer or spoke section 2, as shown includes an inner rim 4, having spoke sockets 5, in which wooden spokes are fitted and from which they extend outward radially. At the outer ends these spokes are secured to a channel like felly 7, which as it provides seating and securing means for the tire may also be referred to as a rim. As shown the spokes are provided at their outer ends with caps or bands 9, which bear against the inner surface of the felly and the spokes are secured to the felly by means of lag screws 11, driven inward toward the center of the wheel from the outside of the rim through suitable apertures 12, and extending into each spoke on the line of the axis.

The felly 7, as shown is of channel shape, the bottom 14, of the channel being nearest the center of the wheel, the side walls 15 and 16, being preferably oppositely inclined so that they converge toward the center of the wheel and diverge toward the periphery. The lefthand or outside wall 15, has a hooked outer peripheral edge 18, to receive the tire bead or edge of the rim depending on the type of tire or rim used and the other side wall has an inclined edge surface 19, to receive a wedge locking ring 20, which enters between the tire or rim 21, and the edge of the rim. The locking ring 20, is held in position by lugs 22, placed at intervals along the inside of the felly, these lugs as shown have a foot 24, which bears on an offset supporting surface 25, which as shown is punched out of the rim for this purpose at the edge of the bottom wall 14. The lug has an inner inclined face 26, which overlies the side wall of the rim, and at its upper edge bears against the wedge ring 20. At its extreme upper end the lug is formed into a hook 27, which takes over the edge or bead 29, of the tire or rim, holding the latter in position on the felly.

The lugs are in turn held in position by bolts 30, one passing through each lug and through the felly from side to side parallel to the axis. The nuts 31, are for convenience preferably brazed in position, and the bolts are passed from the outside inward, that is, they are entered through the lugs. The tire or rim 21, as shown is a circular steel band having a flat peripheral surface 34, and an edge flange 35, the tire or rim being further provided with projecting edges or beads 29, to be engaged by hook 18, on the felly on one side and the hooks 27, on the lugs on the other side. An important advantage of the invention is that it provides not only for the use of a demountable metal flanged rim for street cars, railway cars and busses, but further it provides for the use of an elastic wheel on railway vehicles, i. e. for the use of a metal rim on an elastic wheel and it further provides convertibility in that it makes it possible to drive the same vehicle with the same wheels, both on the road and on rails by the mere change of demountable rims, no more difficult than the ordinary change of rims incident to the operation of an automobile. The use of a demountable tire carrying rim in connection with a similar felly is shown in Fig. 3, of the present application, in which a demountable rim 40, is secured to the felly 7, similar to the felly in Fig. 2, and in exactly the same way, the rim 40, in the present instance having beads 41 and 42, engaged by a hooked edge 18, and the lug hooks 22, and in the form of the invention shown, the rim carries a solid tire 43, though the rim construction is subject to considerable variation within the scope of the invention and either solid or pneumatic may be used and the flanged tire may be secured to any form of wheel in place of a rim having similar beads.

I have thus described specifically and in detail a single embodiment of my invention in order that the nature and operation of same may be clearly understood, however, the specific terms herein are used descriptively rather than in a limiting sense, the scope of the invention being defined in the claims.

What I claim and desire to secure by said Letters Patent is:

1. The combination of a hard tire having an edge flange projecting outward radially therefrom, a projecting bead at each inner peripheral edge, a felly having a hooked flange at one side engaging the corresponding bead and hooked lugs at the other side engaging the other bead.

2. In combination with a vehicle wheel, a hard tire having a tread and an edge flange projecting outwardly radially therefrom beyond the tread, a bead projecting from the inner periphery of said tire at each side and a felly having a hook integral therewith at one side for engaging one said bead and removable hooked lugs at the other side engaging the other bead from the opposite side.

3. A hard tire having an outwardly projecting flange extending radially beyond the tread, a bead extending along the inner edge at each side a stationary hooked member on the wheel engaging said bead at one side, an inclined face on the wheel opposite the other bead, a wedge ring engaging the inclined face and the rim at the other side and lugs for holding the wedge ring in place.

Signed by me at Baltimore, Maryland, this 17th day of July, 1922.

SCHUYLER C. HATFIELD.